UNITED STATES PATENT OFFICE.

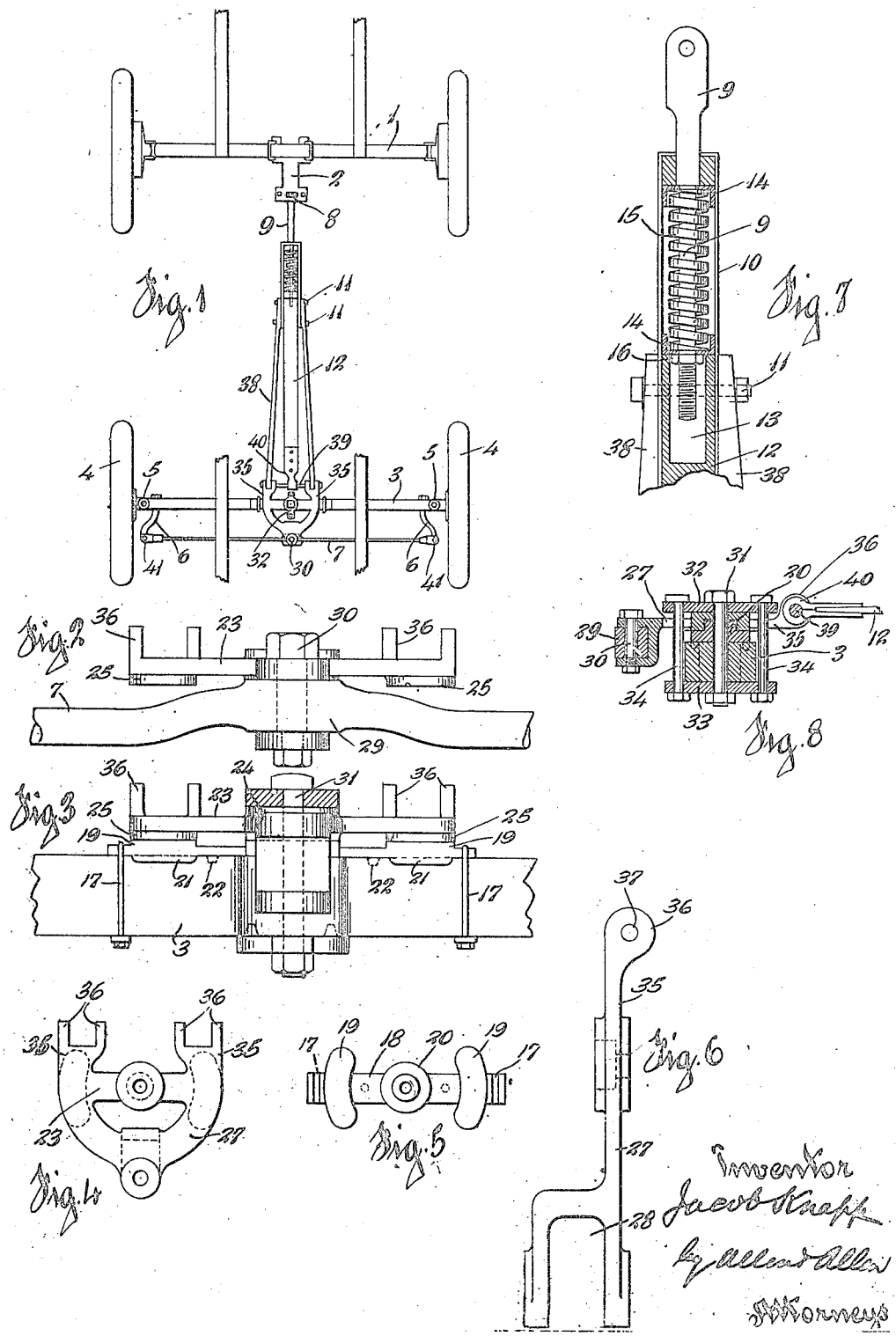

JACOB KNAPP, OF CINCINNATI, OHIO, ASSIGNOR TO THE SECHLER AND COMPANY, OF CINCINNATI, OHIO, A CORPORATION OF OHIO.

STEERING DEVICE FOR DRAWN VEHICLES.

1,247,410.

Specification of Letters Patent.

Patented Nov. 20, 1917.

Application filed October 9, 1915. Serial No. 54,977.

*To all whom it may concern:*

Be it known that I, JACOB KNAPP, a citizen of the United States, and a resident of the city of Cincinnati, in the county of Hamilton and State of Ohio, have invented certain new and useful Improvements in Steering Devices for Drawn Vehicles, of which the following is a full, clear, and exact description, reference being had to the accompanying drawings, forming part of this specification.

My invention relates to devices for use particularly with trailer vehicles for automobiles which serve to couple the trailer to the automobile and at the same time steer the trailer.

The problem presented in providing the most effective construction for this purpose is by no means the simple one it might appear at first blush. Where the drawn vehicle is to be coupled to an automobile and is to be drawn over rough roads with one of the vehicles in a rut or hole and the other riding clear, one machine going up an incline while the other is coming down, the wheel or wheels of one raised suddenly by rocks or obstructions, it is evident that the coupling and steering connections will be subjected to great and unusual twists and strains far in excess of anything experienced in the use of horse drawn vehicles. To furnish the drawn vehicle with an ordinary front wagon axle with the front wheels mounted thereon and to couple the draw bar for the automobile to this axle, gives a rigid non-elastic construction entirely unsuited for the purpose.

With a front axle construction for the drawn vehicle like that in automobiles with short axles and independent knuckle pivots for the front wheels and a steering rod connection, we have the most effective vehicle for draft purposes, but the problem of coupling and steering such a vehicle is a serious one.

It is the object of my present invention to provide a simple and durable construction for such vehicles adapted to stand effectively the strains to which the connecting mechanism must be subjected, as will be hereinafter particularly pointed out, described and claimed.

In the drawings,

Figure 1 is a top plan view of the parts comprising my invention.

Fig. 2 is a rear elevation showing the connecting rod and yoke construction removed from the front axle of the trailer.

Fig. 3 is a rear elevation of the double yoke for the trailer as mounted on the front axle, with the connecting arm removed.

Fig. 4 is a top plan view of the double yoke.

Fig. 5 is a similar view of the supporting plate for the double yoke.

Fig. 6 is a side elevation of the double yoke.

Fig. 7 is a top plan view of the resilient draw bar, partly in section.

Fig. 8 is a central transverse section, taken through the double yoke connection with the front axle.

An automobile having a rear frame member 1 and a coupler 2 secured thereon is employed to draw the trailer vehicle which is provided with the usual fixed front axle 3 having the front wheels 4, 4, pivotally mounted on the ends of the axle by the knuckle joints 5, 5, and with the rearwardly extending lever arms 6, 6, connected together by the steering connecting rod 7 in the usual way for front axle constructions of automobiles. Pivotally connected to the coupler 2 by the coupling pin 8 is a draw bar 9. This draw bar extends into a housing 10 secured by bolts 11 to the outer end of a tongue member 12. The front of the housing is provided with a central aperture through which the draw bar 9 passes, where it enters into a socket 13 in the outer end of the tongue member. Slidably mounted in the opposite ends of the housing are the cup-shaped washers 14, 14, having apertures for the passage of the draw bar, and a heavy coiled spring 15 is mounted between the cups around the draw bar. At the inner end of the draw bar an adjustable nut 16 is provided for adjusting the length of the draw bar.

It is evident that, by this construction, with a forward pull on the draw bar, the nut 16 will be drawn against the cup-shaped washer to compress the coiled spring; while with a sudden stop or backing of the drawing vehicle, the opposite washer will compress the coiled spring, and thus in both directions the tongue and trailer will be relieved from jar. It is evident that by this construction angular movement about the axis of the bar as a whole is permitted between the housing 10 and the bar 9.

Mounted at the middle of the front axle 3 of the trailer and secured by clips 17, 17, is the bearing plate 18, having elliptical bearing surface portions 19, 19, and a central boss 20. To further effectively hold the bearing plate on the axle, side flanges 21, 21, are provided to engage the sides of the axle 3, and lugs 22, 22, fit into depressions on the top surface of the axle.

Mounted on this bearing plate is the double yoke plate 23, provided with a central socket 24 to fit over the boss 20 on the bearing plate, and also provided with depending bearing surfaces 25, 25, to engage the portions 19, 19, of the bearing plate. The yoke 23 has forwardly extending arms 35, 35, and a rearwardly extending portion 27 which is bifurcated to form a horizontal slot 28 for the reception of the flattened portion 29 of the steering connecting rod. This connecting rod is flattened at its middle portion and bent up slightly to enable it to be coupled to the yoke by the vertical bolt 30, so that we have a single vertical pivot for the steering connecting rod.

The yoke 23 and the bearing plate are held together by a central bolt 31 which passes down through a central aperture in the yoke and plate and through a corresponding aperture in the axle. In addition to this, a pair of washer plates 32, 33, are provided, one on top of the yoke and the other underneath the axle through which the central bolt 31 also passes, and these plates are further secured together by end bolts 34, 34, so that the plates are held securely together, allowing, however, the yoke 23 to readily turn on the boss 20.

A pair of forwardly extending arms 35, 35, are formed on the yoke 23, with slotted lugs 36 at the outer end, and provided with central eyes 37 in alinement. Through these eyes the yoke is horizontally pivoted to the spreading side arms or braces 38, 38, of the tongue construction by the horizontal pin 39. This pin also passes through the eye 40, secured on the inner end of the tongue 12, the three attaching points being in horizontal alinement at right angles to the tongue 12 so that in this way we have a horizontal pivot for the tongue and draw bar with the yoke of the trailer and a vertical pivot on the bolt 30 for the steering connecting rod. The outer ends of this steering connecting rod are provided with the usual screwthreaded connection with the ends of the levers 6, 6, on the wheel axle knuckles, and the adjustment of the length of the connecting rod 7 is made so that the pivotal points 41, 41, and the knuckle pivots 5, 5, are parallel to the wheels and also parallel to the line between the central pivot 31 of the yoke with the axle, and the pivot 30 of the yoke with the steering connecting rod.

It is very essential that these two vertical pivot points should be in alinement, because it is only in this way that parallelism can be maintained by the two front wheels of the trailer vehicle. As the yoke is shifted on its central vertical pivot by the movement of the drawing vehicle in turning corners, to maintain the wheels in parallel position, it is essential that the steering connecting rod 7 shall remain parallel with the axle, so that with the shifting of the connecting rod each wheel will turn to the same extent.

It is also of importance that the connection between the yoke on the axle of the trailer and the tongue and draw bar shall be a horizontal pivotal connection, inasmuch as the rear wheels of the drawing vehicle and the front wheels of the trailer often are in different horizontal positions, one going up while the other is coming down.

With the construction as shown and described, we have a very effective and strong construction which is able to stand the shocks and strains to which the vehicles are subjected.

It will be of course understood that various changes in details of the construction may be made without departing from the spirit of my invention. For example, there is no reason why the connecting rod for the wheel levers should not be in two parts, so long as the pivotal connection is maintained in parallelism.

Having thus described my invention, what I claim as new and desire to secure by Letters Patent, is:—

1. In a steering device for automobile trailers, a sectional draw-bar having vertically pivoted means at its outer end for attachment to the frame of a tractor, the sections being resiliently connected and capable of angular movement about the axis of the bar, a rigid fifth wheel plate pivoted on the axle of the trailer, said plate having lateral projecting arms, a horizontal pin mounted in said arms, said draw-bar being pivoted on said pin, a parallel motion steering gear for said trailer comprising a connecting rod and a vertical pivotal connection therefor with said plate.

2. In a steering device for automobile trailers, a sectional draw-bar having vertically pivoted means at its outer end for attachment to the frame of a tractor, the sections being resiliently connected and capable of angular movement about the axis of the bar, a rigid fifth wheel plate pivoted on the axle of the trailer, said plate having lateral projecting arms, a horizontal pivotal connection for said draw-bar and projecting arms, a parallel motion steering gear for said trailer comprising a connecting rod and a vertical pivotal connection therefor with said plate and connecting rod.

3. In a steering device for automobile trailers comprising pivot axle wheels and a connecting rod between the pivot axle wheels, a fifth wheel pivotally supported on the axle of the trailer and coupled to the connecting rod, an extended bearing substantially in the plane of the fifth wheel, a long draw-bar pivotally supported on said bearing and lateral braces on the draw bar having their free ends pivotally supported on said bearing.

4. A steering device for automobile trailers comprising pivot axle wheels, a rigid fifth wheel pivoted on the axle of the trailer and having two arms convergent to a common point, a connecting rod between the pivot wheels pivoted to the yoke at said common point, a pin mounted in the free ends of the yoke arm and forming an extended bearing normally parallel to the axle of the trailer, a draw-bar, and lateral diverging brace rods having their ends pivotally supported on said pin.

5. In combination with a tongue for a trailer vehicle, a bearing plate on the axle of the vehicle, a pivot boss on the bearing plate, a rigid fifth wheel pivotally mounted on the boss, one end of the fifth wheel pivotally coupled to the tongue on a horizontal axis, and the other end pivotally coupled to the steering mechanism of the trailer on a vertical axis, and means for securing said fifth wheel comprising upper and lower washer plates and bolts connecting said plates.

6. In combination with a tongue for a trailer vehicle, a bearing plate on the axle of the vehicle, a pivot boss on the bearing plate, a fifth wheel plate pivotally mounted on the boss, one end of the fifth wheel plate pivotally coupled to the tongue on a horizontal axis, and the other end pivotally coupled to the steering mechanism of the trailer on a vertical axis, and means for securing said fifth wheel plate comprising a securing member passing over said fifth wheel plate above the said boss and secured beneath the axle.

7. In combination with a tongue for a trailer vehicle, a bearing plate on the frame of the vehicle, a pivot boss on the bearing plate, elliptical bearing surfaces at the ends of said bearing plate, a double yoke pivotally mounted on the boss and bearing on said bearing plate, one of the yoke members thereof being coupled horizontally to the tongue and the other vertically to the steering mechanism of the trailer.

JACOB KNAPP.